RE 24903

April 21, 1959     F. H. SMITH     2,883,200
COLLET PADS

Filed May 11, 1955     3 Sheets–Sheet 1

FREDERICK H. SMITH, INVENTOR.

BY Donald E. Windle.
ATTORNEY.

April 21, 1959 F. H. SMITH 2,883,200
COLLET PADS
Filed May 11, 1955 3 Sheets-Sheet 2

FREDERICK H. SMITH,
INVENTOR.

BY Donald E. Windle.
ATTORNEY.

April 21, 1959  F. H. SMITH  2,883,200
COLLET PADS

Filed May 11, 1955   3 Sheets-Sheet 3

FREDERICK H. SMITH,
INVENTOR.

BY Donald E. Windle
ATTORNEY.

United States Patent Office 2,883,200
Patented Apr. 21, 1959

2,883,200

COLLET PADS

Frederick H. Smith, Dayton, Ohio

Application May 11, 1955, Serial No. 507,564

3 Claims. (Cl. 279—58)

The invention relates to collets which are used in connection with automatic screw machines and turret lathes, and through which stock is advanced and is gripped by collet pads in the machining process of the stock.

The present invention relates to collet pads and to the construction thereof, with the same being adapted for use without the use of master collets in connection therewith. In the conventional collet system, the master collet is of tubular form and tempered so as to form a series of spring fingers and with the end portions of the spring fingers having separate hardened pads secured thereto. Another form of the conventional collets is of tubular form slotted to form a series of spring fingers and with the finger ends being devoid of separate pad members. In either of the conventional types of collets, the tubular member is slotted to form the spring fingers and then is hardened to provide the necessary springiness therein, after which it is necessary to anneal the jaw or work-engaging end portion in order that the same may be machined or ground to the necessary workable limits. In the annealing process, the work-engaging end becomes soft and is subject to considerable wear thereafter in the use thereof. In the use of pads with the conventional type of master collets, the pads are in the form of inserts secured in the master collets by means of screws.

It is the intent and purpose of the present invention to provide collet pads of such design and construction to replace the conventional master collets and their pads with a more simple and economical form of collet pads which entirely eliminates the master collets.

The principal object of the invention therefore is the provision of collet pads eliminating the combination of master collets and their associated pad members.

A second object is the provision of collet pads which are simple of construction and which are more economical in the manufacture thereof than the conventional type master collets and their pads.

Another object is the provision of collet pads which are adapted to an unlimited variety of sizes and shapes of stock.

A further object of the invention is the provision of a collet pad construction in which the pads are provided as individual members and are tied together into a single unit.

Other particular objects and advantages of the invention will suggest themselves in the course of the following description, and that which is new will be pointed out in the appended claims.

The preferred and most satisfactory manner of carrying out the principles of the invention in a practical and economical manner is shown in the accompanying drawings, in which.

Like characters of reference designate like parts throughout the several views.

In order that the invention may be more fully understood and appreciated, I will now take up a detailed description thereof, in which the same will be more fully set forth.

Figure 1:
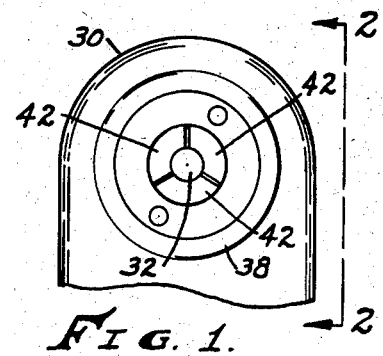
Figure 1 is a partial elevation of the stock-working end of a machine showing the housing, the stock, the spindle nut, and the collet pads embodying the features of the invention.
Figure 2:
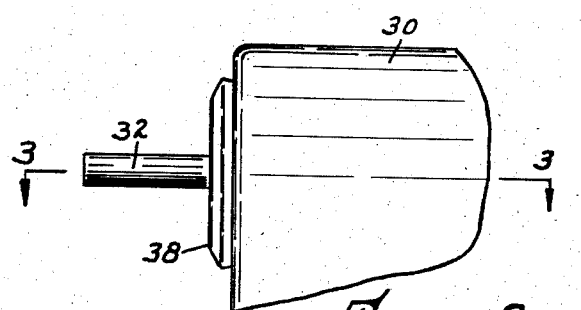
Figure 2 is a side elevation of the end portion of the machine, taken from line 2—2 of Figure 1.
Figure 3:
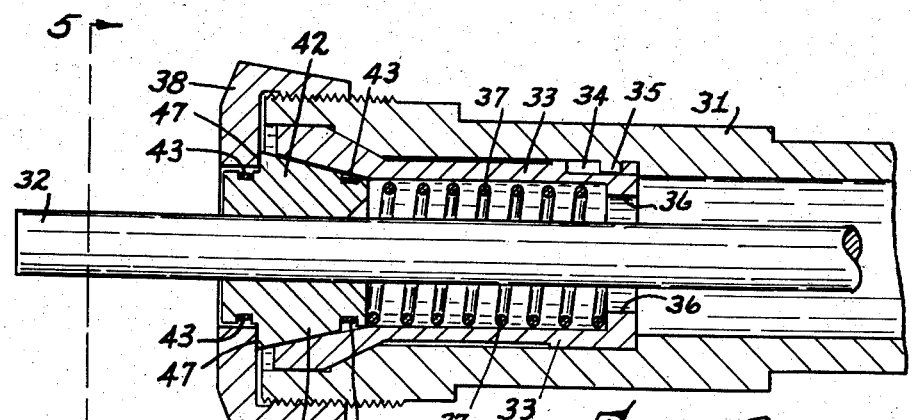
Figure 3 is a detail section through the spindle assembly, as taken on line 3—3 of Figure 2, and showing the collet pads in engaged relation with the stock.
Figure 4:
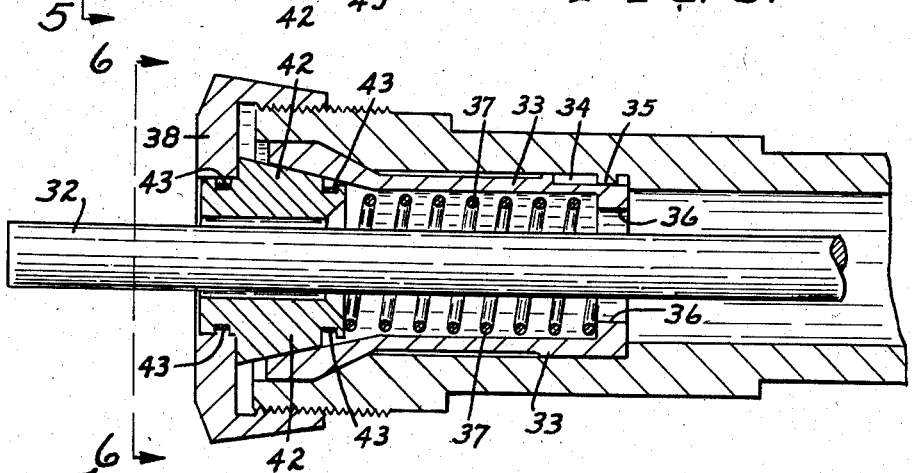
Figure 4 is a detail section similar to that shown in Figure 3, but showing the collet pads in disengaged relation with the stock.
Figure 5:
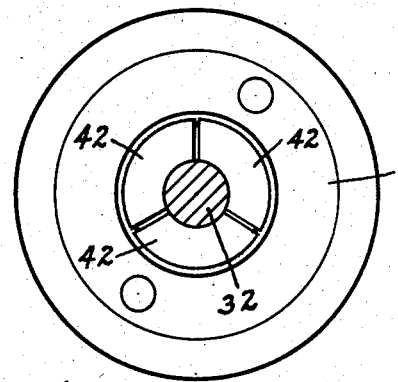
Figure 5 is an end elevation of the spindle assembly including the collet pads and the spindle nut, as taken from line 5—5 of Figure 3.
Figure 6:
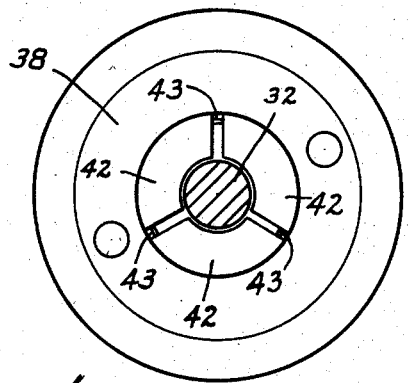
Figure 6 is an end elevation, taken from line 6—6 of Figure 4.

Referring now to the drawings in detail, 30 represents the head of the machine in which spindle 31 is located, with the spindle being driven by gears (not shown) of the machine. Spindle 31 is hollow for the reception of stock 32 extending therethrough. The forward end of spindle 31 is provided with the removable sleeve 33, with the sleeve having a channel 34 formed in its side and registering with a stud 35 of the spindle 31. The sleeve has a flange 36 formed at the rear end thereof, against which the rear end of compression spring 37 is seated, The assembled collet pads 42 are placed in the forward end of sleeve 33, as shown in Figures 3 and 4. The forward end of the sleeve is tapered to fit the tapered surface of the collet pads, and with the rear end of the collet pads providing a surface for engagement with the forward end of compression spring 37. After the collet pad assembly has been positioned in the forward end of sleeve 33, spindle nut 38 is threaded onto the forward end of the spindle and with the inner surface of the spindle nut being adapted to bear against and force the collet pads rearwardly in the tapered end of the sleeve. With the rearward movement of the collet pad assembly in the tapered end of the sleeve, the collet pads are forced inwardly in concentric relation and thereby provide a gripping action around the stock 32, as shown in Figures 3 and 5. When the spindle nut is loosened slightly, the movement thereof permits the compression spring to force the collet pad assembly forwardly, upon which movement, the collet pads expand concentrically outwardly with the gripping action of the collet pads being released from the stock 32, as shown in Figures 4 and 6, after which the stock is advanced by means of the stock-advancing fingers (not shown) of the machine.

Figure 7:
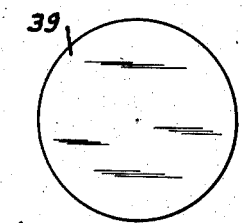
Figure 7 is an end view of a piece of stock used in the forming of the collet pads.
Figure 8:
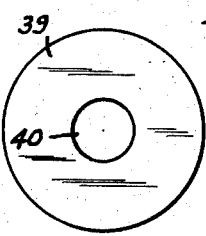
Figure 8 is an end view of the piece of stock shown in Figure 7, but with the same having a bore formed therethrough.
Figure 9:
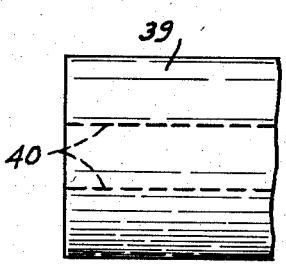
Figure 9 is a side elevation, taken from line 9—9 of Figure 8.
Figure 10:
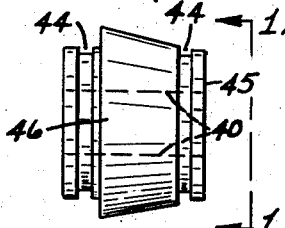
Figure 10 is an end elevation of the stock after the same has been formed and cut off to provide the collet pad body.
Figure 12:
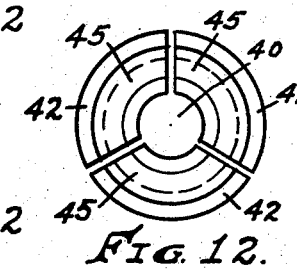
Figure 12 is a detail end elevation of the body after the same has been cut to provide the three pad members.
Figure 13:
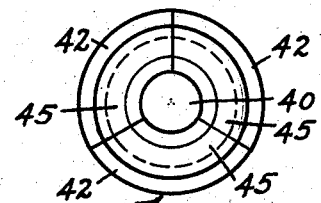
Figure 13 is a detail end elevation of the three pad members as the same appear when brought together by means of resilient spring rings which fit into formed grooves or channels.
Figure 11:
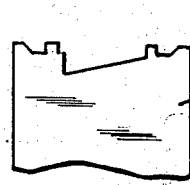
Figure 11 is an elevational view showing the configuration of the end portion of the tool used in forming the body shown in Figure 10.
Figure 14:
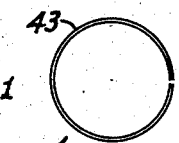
Figure 14 is an elevational view of one of the resilient spring rings used in holding the pad members in assembled condition.
Figure 15:
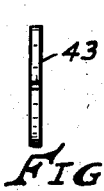
Figure 15 is a side view of the resilient spring ring shown in Figure 14.
Figure 16:
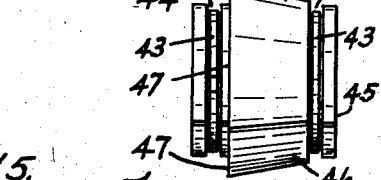
Figure 16 is a side elevation showing the pad members held in assembled condition by means of the spring rings.

The collet pads are formed from a length of stock 39 (shown in Figure 7). The stock is drilled forming the bore 40 therethrough, with the bore being of substantially the same size as the stock with which the same is to be used. After bore 40 has been formed in the stock, the outer surface of the stock is formed by means of cutting tool 41 shown in Figure 11 and with the same forming the outer periphery on the stock as shown in Figure 10. After the outer periphery has been formed as shown in Figure 10, the same is cut into segments 42 by means of a saw, as indicated in Figure 12. Figure 13 is an end view of the segments 42 in assembled relation. The segments are held in assembled condition by means of a pair of resilient spring rings 43 which are positioned in channeled grooves 44 of the segments, as shown in Figure 16. The rings 43 prevent displacement of the segments both concentrically and longitudinally with relation to each other.

The rearward end 45 of the segments provide a seat for the forward end of compression spring 37. The beveled or tapered surface 46 of the segments are adapted to engage the tapered inner surface of the forward end of sleeve 33, while the forward faces 47 of the segments are adapted to bear against the rear surface of spindle nut 39, as more clearly shown in Figures 3 and 4.

Figure 17:
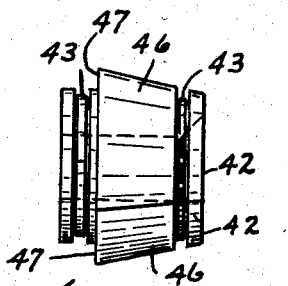
Figures 17, 18 and 19 are side elevations of assembled pad members, and with each of the figures showing a modified design of the outer peripheral surface of the assemblies.
Figure 18:
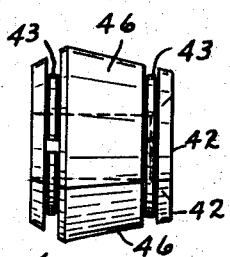
Figure 19:
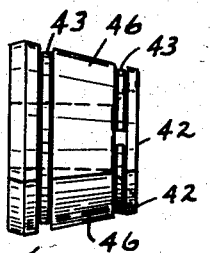

In Figures 17, 18 and 19, I have shown outer profiles of the collet pads different from that shown in Figures 3, 4, 10 and 16, but with the segments 42 comprising the same being secured against displacement by means of the springs 44.

Figure 20:
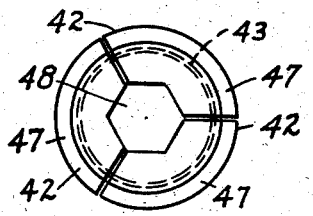
Figure 20 is an end elevation of an assembly showing the same as being formed to accept hexagonal stock.

Figure 20 shows an assembly of collet pad members having a hexagonal opening 48 formed therethrough for the reception of hexagon-shaped stock.

Figure 21:
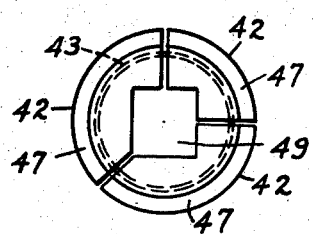
Figure 21 is an end elevation of a pad assembly showing the same as being formed to accept square stock.

Figure 21 shows an assembly of the collet pad members having a square opening 49 formed therethrough for the reception of square stock.

Figure 22:
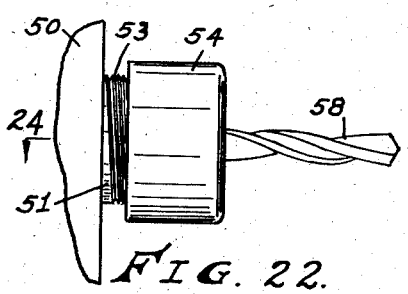
Figure 22 is an elevational view of the end portion of an automatic screw machine or a lathe in which the collet pads are adapted to be used.
Figure 23:
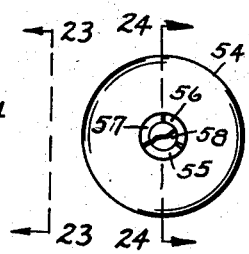
Figure 23 is an end view, taken from line 23—23 of Figure 22.
Figure 24:
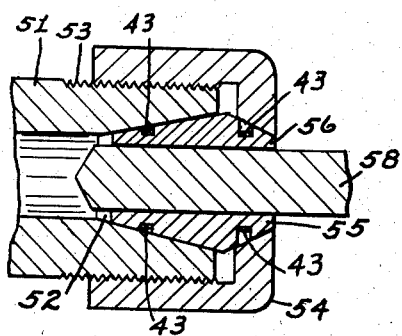
Figure 24 is a detail section, taken on line 24—24 of Figure 23.
Figure 25:
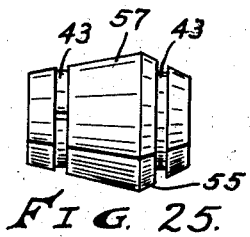
Figure 25 is a side elevation of the collet pad assembly shown in Figures 22, 23 and 24.
Figure 26:
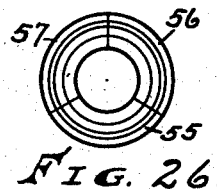
Figure 26 is an end elevation of the collet pad assembly shown in Figure 25.

In Figure 22 numeral 50 designates the head of the automatic screw machine or the lathe while 51 designates the stationary tapered sleeve member of the machine and with the sleeve having a taper 52 formed therein and with threads 53 being formed thereon for the reception of the collet chuck nut 54. It will be noted that the collet chuck nut 54 has a tapered aperture formed therein for engagement with the collet pad assembly.

The collet pad assembly shown in Figures 23, 24, 25 and 26 is composed of segments 55, 56 and 57 which are normally held in assembled condition by means of the rings 43. It will be noted that segments 55, 56 and 57 are tapered at both ends with the taper of the rear portion thereof being adapted to coincide with the taper 52 of sleeve 51. The forward ends of segments 55, 56 and 57 are tapered to coincide with the taper formed in the collet chuck nut 54. 58 designates a drill or other tool to be used in the collet.

In the use of the collet pad assembly as shown in Figures 22 through 26, the collet pad assembly is inserted in the tapered sleeve 51, after which the collet chuck nut 54 is threaded onto the sleeve to retain the collet pad assembly therein. Before the collet chuck nut is tightened, a drill 58 or other tool is inserted in the collet pad assembly, after which the collet chuck nut 54 is tightened onto the collet pad assembly causing the pads 55, 56 and 57 to securely grip the drill or other tool. When it is desired to remove or adjust the drill or other tool, the collet chuck nut is loosened only sufficiently for the pads to release their grip on the drill or other tool, and with the releasing of the gripping action permitting the removal of the drill or other tool or to make any necessary adjustments thereto.

It is to be observed, by comparing the collet pads embodying the features of the invention with the conventional collets, that the subject collet pads are more simple of construction and more economical to manufacture.

After the collet pads are formed, the same are heat treated in order that sufficient hardness will be embodied therein to prevent excessive wear, rather than the method used in the conventional collets wherein the same must be annealed in order that they may be machined to fit the stock.

I desire that it be understood that I am not to be limited to the specific design and construction of the collet pads herein shown and described, but that minor changes, such as the outer design and the number of segments, may be made therein, insofar as the changes may fall within the scope of the appended claims.

Having now fully shown and described the invention, what I claim, and desire to secure by Letters Patent of the United States, is:

1. A collet pad assembly adapted to fit into a tapered collet sleeve, said collet pad assembly including a plurality of pads, the pads when assembled having a bore substantially equal to the work passing through the bore, the ends of the collet pads having diameters smaller than the maximum diameter of the pads, the one end of the pads tapering uniformly to snugly fit the taper of the collet sleeve, a pair of grooves near the ends of the collet pads so that the grooves are located in the smaller diameters of the pads, and compression springs mounted in the grooves for biasing the collet pads into contact with the work.

2. A collet pad assembly according to claim 1, wherein each of the collet pads is provided with a radially disposed surface between the larger end of the tapered portion and the other end of the collet pad.

3. A collet pad assembly according to claim 1, wherein both ends of the collet pads are tapered, one end having a much shorter taper than the other end, and whereto the grooves are located in the tapered surfaces in the vicinity of the ends of the collet pads.

References Cited in the file of this patent

UNITED STATES PATENTS

| 905,919 | Pfeifer | Dec. 8, 1908 |
| 2,040,678 | Van Buskirk | May 12, 1936 |
| 2,601,419 | Spahn | June 24, 1952 |

FOREIGN PATENTS

| 182 | Great Britain | Jan. 3, 1908 |
| 566,092 | Great Britain | Dec. 13, 1944 |